(12) United States Patent
Nakagawa

(10) Patent No.: US 8,189,224 B2
(45) Date of Patent: May 29, 2012

(54) PRINTING APPARATUS AND PRINT MANAGING METHOD

(75) Inventor: Isamu Nakagawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 516 days.

(21) Appl. No.: 12/433,671

(22) Filed: Apr. 30, 2009

(65) Prior Publication Data

US 2009/0273805 A1    Nov. 5, 2009

(30) Foreign Application Priority Data

May 2, 2008    (JP) .................... 2008-120511

(51) Int. Cl.
*G06F 3/12*    (2006.01)
*G06K 15/00*   (2006.01)
*B41J 2/47*    (2006.01)

(52) U.S. Cl. ...... 358/1.15; 358/2.1; 358/1.13; 358/1.14; 347/240

(58) Field of Classification Search ............ 358/2.1, 358/1.15, 1.14; 1/1; 347/240; 707/999.003
See application file for complete search history.

(56) References Cited

U.S. PATENT DOCUMENTS

2004/0095459 A1* 5/2004 Russell et al. .............. 347/240
2005/0134905 A1* 6/2005 Horiyama ................. 358/1.15

FOREIGN PATENT DOCUMENTS

JP    2001-350936    12/2001

* cited by examiner

*Primary Examiner* — Charlotte M Baker
*Assistant Examiner* — Rury Grisham
(74) *Attorney, Agent, or Firm* — Canon USA Inc IP Division

(57) ABSTRACT

Each time printing is performed by an MFP, a controller control unit counts up a billing counter value stored in a billing-counter recording unit. Additionally, each time a print job is completed, the controller control unit stores a job history of the print job in a job-history storage unit. A job history of a print job that is in progress at a predetermined counting time is divided into a plurality of job histories and managed by a job-history managing application.

9 Claims, 15 Drawing Sheets

FIG. 5

| COUNTER TYPE | COUNTER VALUE |
|---|---|
| TOTAL | 85686 |
| BLACK-AND-WHITE TOTAL | 38565 |
| COLOR TOTAL | 47121 |

FIG. 7

Counting Setting

Counting Date : 20 ⌄ ~601

Counting Time : 17:00 ⌄ ~602

OK   Cancel 603   604

FIG. 9

| JOB ID | JOB TYPE | STATUS |
|--------|----------|--------------|
| 1234   | PDL      | IN PROGRESS  |
| ⋮      | ⋮        | ⋮            |

FIG. 10

| ITEM | VALUE |
|---|---|
| JOB ID | 1234 |
| STATUS | SUSPENDED |
| START TIME | 11/20/2007 16:40:01 |
| END TIME | - |
| USER NAME | Kosugi |
| DEPARTMENT NAME | DESIGN DEPT. |
| DOCUMENT NAME | userneeds_research.doc |
| NUMBER OF LOGICAL FACES | 100 |
| PAPER SIZE | A4 |
| NUMBER OF EJECTED SHEETS | 70 |
| NUMBER OF FACES | 70 |
| PAGE LAYOUT | 1 |
| COLOR MODE | COLOR |
| PRINT SIDE | SINGLE |

FIG. 11

| ITEM | VALUE |
|---|---|
| JOB-HISTORY RECORD NUMBER B | 11234 |
| JOB ID | 1234 |
| STATUS | SUSPENDED (GETTING COUNTER VALUES) |
| START TIME | 11/20/2007 16:40:01 |
| END TIME | 11/20/2007 17:00:00 |
| USER NAME | Kosugi |
| DEPARTMENT NAME | DESIGN DEPT. |
| DOCUMENT NAME | userneeds_research.doc |
| NUMBER OF LOGICAL FACES | 100 |
| PAPER SIZE | A4 |
| NUMBER OF EJECTED SHEETS | 70 |
| NUMBER OF FACES | 70 |
| PAGE LAYOUT | 1 |
| COLOR MODE | COLOR |
| PRINT SIDE | SINGLE |

FIG. 13

| ITEM | VALUE |
| --- | --- |
| JOB-HISTORY RECORD NUMBER A | 21234 |
| JOB ID | 1234 |
| STATUS | COMPLETED AFTER SUSPENDED |
| START TIME | 11/20/2007 16:40:01 |
| END TIME | 11/20/2007 17:17:25 |
| USER NAME | Kosugi |
| DEPARTMENT NAME | DESIGN DEPT. |
| DOCUMENT NAME | userneeds_research.doc |
| NUMBER OF LOGICAL FACES | 100 |
| PAPER SIZE | A4 |
| NUMBER OF EJECTED SHEETS | 100 |
| NUMBER OF FACES | 100 |
| PAGE LAYOUT | 1 |
| COLOR MODE | COLOR |
| PRINT SIDE | SINGLE |

FIG. 14

| JOB HISTORY NUMBER | JOB ID | START TIME | END TIME | STATUS | NUMBER OF SHEETS |
|---|---|---|---|---|---|
| 11232 | 1232 | 11/20/2007 3:10 PM | 11/20/2007 3:15 PM | STOP | 12 |
| 11233 | 1233 | 11/20/2007 4:10 PM | 11/20/2007 4:15 PM | COMPLETED | 21 |
| 11234 | 1234 | 11/20/2007 4:40 PM | 11/20/2007 5:00 PM | COMPLETED (1/2) | 70 |
| 11235 | 1234 | 11/20/2007 5:00 PM | 11/20/2007 5:17 PM | COMPLETED (2/2) | 30 |
| 11236 | 1235 | 11/20/2007 6:10 PM | 11/20/2007 6:21 PM | COMPLETED | 21 |

FIG. 15

Counting Setting

Counting Time :

1301 — Obtain a job history at [ 05 ∨ ] minutes past the hour.

[ OK ] — 1302    [ Cancel ] — 1303

FIG. 17

| DIRECTORY INFORMATION |
|---|
| FIRST PROCESSING PROGRAM<br>PROGRAM CODE GROUP CORRESPONDING TO STEPS IN FLOWCHART OF FIG. 8 |
| SECOND PROCESSING PROGRAM<br>PROGRAM CODE GROUP CORRESPONDING TO STEPS IN FLOWCHART OF FIG. 12 |
| THIRD PROCESSING PROGRAM<br>PROGRAM CODE GROUP CORRESPONDING TO STEPS IN FLOWCHART OF FIG. 16 |
|  |
|  |
|  |
|  |

PRINTING APPARATUS AND PRINT MANAGING METHOD

BACKGROUND OF THE INVENTION

1. Field of the Invention

The present invention relates to printing apparatuses, such as printers and copiers, and particularly to print management in a printing apparatus having a counter capable of counting up each time printing is performed.

2. Description of the Related Art

Recently, copiers have been capable not only of making copies of an original, but also of printing according to print jobs received from external clients, and of externally and electronically transmitting data of a scanned original using electronic mail or file transfer capabilities. Such copiers are called multi function peripherals (MFPs).

Examples of a method for charging for MFP use include counter charging. An MFP has a billing counter that is incremented by one each time a page is printed. Examples of the billing counter include one capable of counting up according to the number of ejected sheets, and another capable of counting up according to the number of faces of sheets (e.g., for double-sided printing, the billing counter counts up twice per sheet). According to an increment of the billing counter per unit time, an MFP supplier company determines the amount its customer is to be charged. Values of the billing counter are collected periodically on predetermined cutoff dates by an external server or a dedicated application in the MFP.

To calculate the amount of MFP usage of each department or user, job-history managing software for managing job histories has been used. The job-history managing software obtains job histories, adds up the amount of MFP usage of each department or user using the MFP, and generates billing information (see, e.g., Japanese Patent Laid-Open No. 2001-350936).

Recently, for cost savings and environmental protection purposes, there have been demands for detailed and clarified cost sharing.

Thus, there have been demands that costs determined by counter charging be divided proportionally among departments and users according to the amount of MFP usage calculated by the job-history managing software, and departments and users who actually used the MFP be charged.

However, in the known technique described above, depending on the timing at which a value of the billing counter is obtained and confirmed, the sum of the numbers of printed sheets in job histories for a target period may not match an increment of the billing counter.

The reason is that although a job history is generated upon completion of a job, the billing counter is incremented each time a sheet is ejected.

For example, when a job of printing of a 100-page document starts and a cutoff time for the billing counter is reached upon ejection of 70 sheets, the billing counter is incremented for the ejected 70 sheets. However, since the job has not yet been completed, the number of sheets ejected in this job does not appear in the job history. Thus, there is a 70-count difference between the increment of the billing counter and the total number of printed sheets in the job history.

A description will be given about commercial printing which is carried out using MFPs and is becoming widespread today. In the cases where a large number of copies are printed by a device capable of allowing the user to specify a multiple number of copies, the device may often print, for example, 1000 copies of a one-page leaflet. In this case, due to the problem described above, there may be up to a 999-count difference between the increment of the billing counter and the total number of printed sheets in a job history.

SUMMARY OF THE INVENTION

For accurate cost analysis and billing, the present invention provides a mechanism for matching, in a target counting period, the sum of the numbers of printed sheets in job histories and an increment of a billing counter.

The present invention has been made to solve the problems described above. According to an aspect of the present invention, a printing apparatus includes a job-history storage unit configured to store, each time a print job is completed, a job history of the print job; a counter recording unit; a count-up unit configured to count up, each time printing is performed by the printing apparatus, counter information recorded in the counter recording unit; and a managing unit configured to manage a print job that is in progress at a predetermined counting time in a plurality of separate job histories.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 5 illustrates an example of billing counter values displayed on the touch panel included in the UI unit of FIG. 1.

FIG. 7 illustrates an example of a counting-time setting screen serving as a user interface displayed by a UI unit of FIG. 6.

FIG. 9 illustrates an example of part of information obtained by a controller control unit of FIG. 6.

FIG. 10 illustrates an example of job information obtained by a job-history collecting unit of FIG. 6.

FIG. 11 illustrates an example of a job history recorded in a data holding unit of FIG. 6.

FIG. 13 illustrates an example of a job history extracted by a counting unit of FIG. 6.

FIG. 14 illustrates an example of a job history list registered in the data holding unit of FIG. 6.

FIG. 15 illustrates an example of a counting-time setting screen according to a second exemplary embodiment of the present invention.

FIG. 17 is a diagram for explaining a memory map of a storage medium for storing various data processing programs readable by a printing apparatus according to an exemplary embodiment of the present invention.

DESCRIPTION OF THE EXEMPLARY EMBODIMENTS

Various exemplary embodiments for carrying out the present invention will now be described with reference to the drawings.

Hereinafter, a first exemplary embodiment of the present invention will be described with reference to the drawings.

Figure 1:
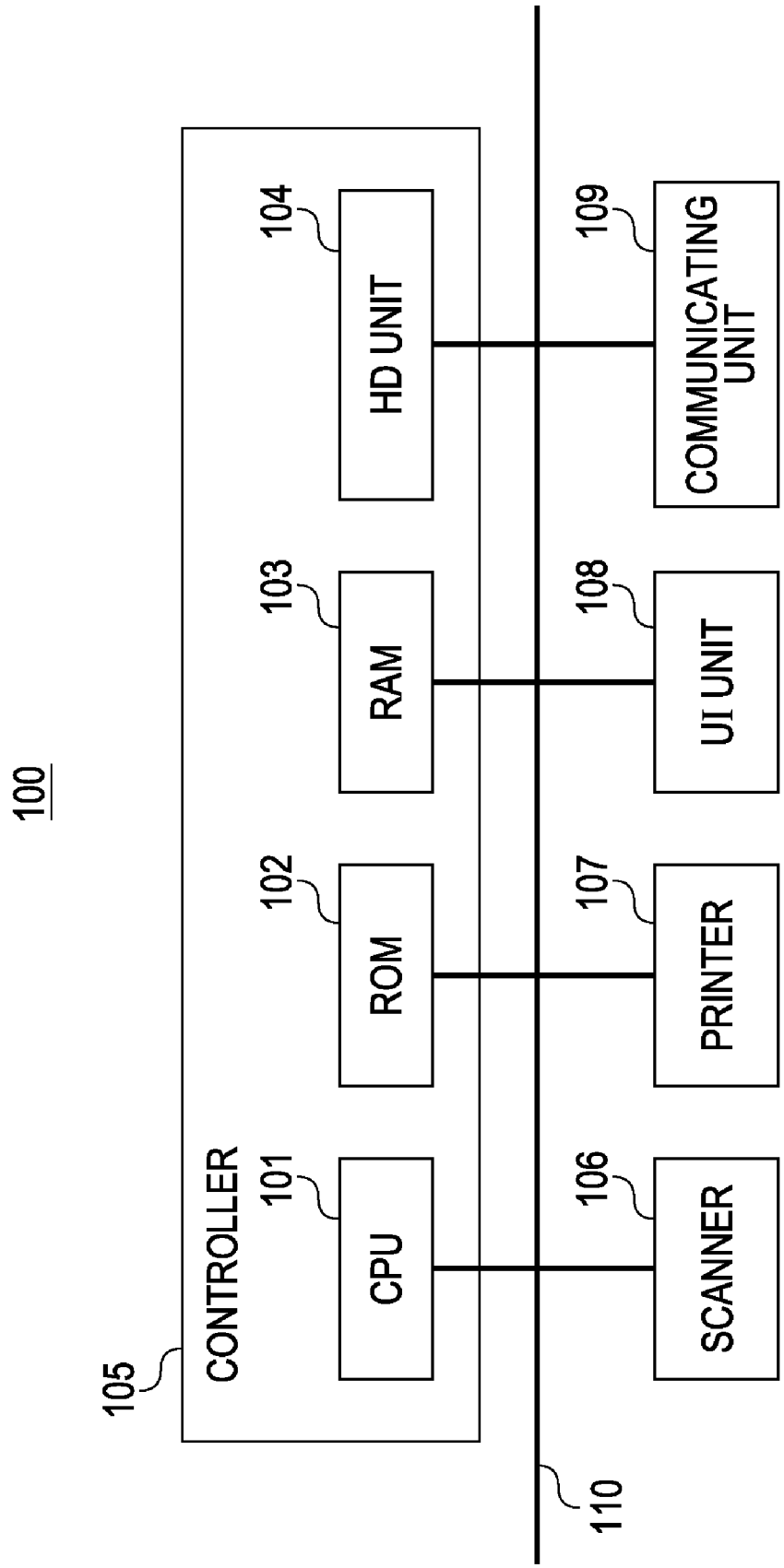
FIG. 1 is a block diagram illustrating an example of a printing apparatus according to an exemplary embodiment of the present invention.

FIG. 1 is a block diagram illustrating an example of a printing apparatus according to the present exemplary embodiment. Although an MFP will be described herein, a printer etc. may be described as an example of the printing apparatus of the present exemplary embodiment.

FIG. 1 illustrates an MFP 100 controlled by a controller 105. A central processing unit (CPU) 101 controls the controller 105 and performs computations etc.

A read-only memory (ROM) 102 is a storage area for storing information, such as a system startup program. A random-access memory (RAM) 103 is a data storage area with no usage restrictions. The RAM 103 functions as a work memory for the CPU 101. For example, the RAM 103 is an area where programs, such as an operating system (OS), a communication control program, and an engine control program, are loaded, and where data is stored during execution of the programs.

A nonvolatile storage device (HD unit) 104 is a hard disk (HD), a static RAM (SRAM), or the like.

A scanner 106 optically reads an image of an original placed on an original plate and transfers the read image to the RAM 103.

A printer 107 performs a printing operation under control of the controller 105. The printer 107 is capable of printing print data generated by analyzing a print job received from an information processing apparatus via a communicating unit 109, or image data read by the scanner 106. The printer 107 or the scanner 106 is configured such that an optional device is connectable thereto. For example, a double-sided printing unit and a sheet post-processing unit are connectable to the printer 107, while an automatic document feeder (ADF) and a recirculating document feeder (RDF) are connectable to the scanner 106.

A UI unit 108 includes a key input unit and a touch panel for receiving an instruction from the user, or displaying status and setting information of the scanner 106 and the printer 107.

The communicating unit 109 serves as a network communication controller. The communicating unit 109 is capable of communicating with other devices and computers via a network. A system bus 110 serves as a data path between the above-described components.

Figure 2:
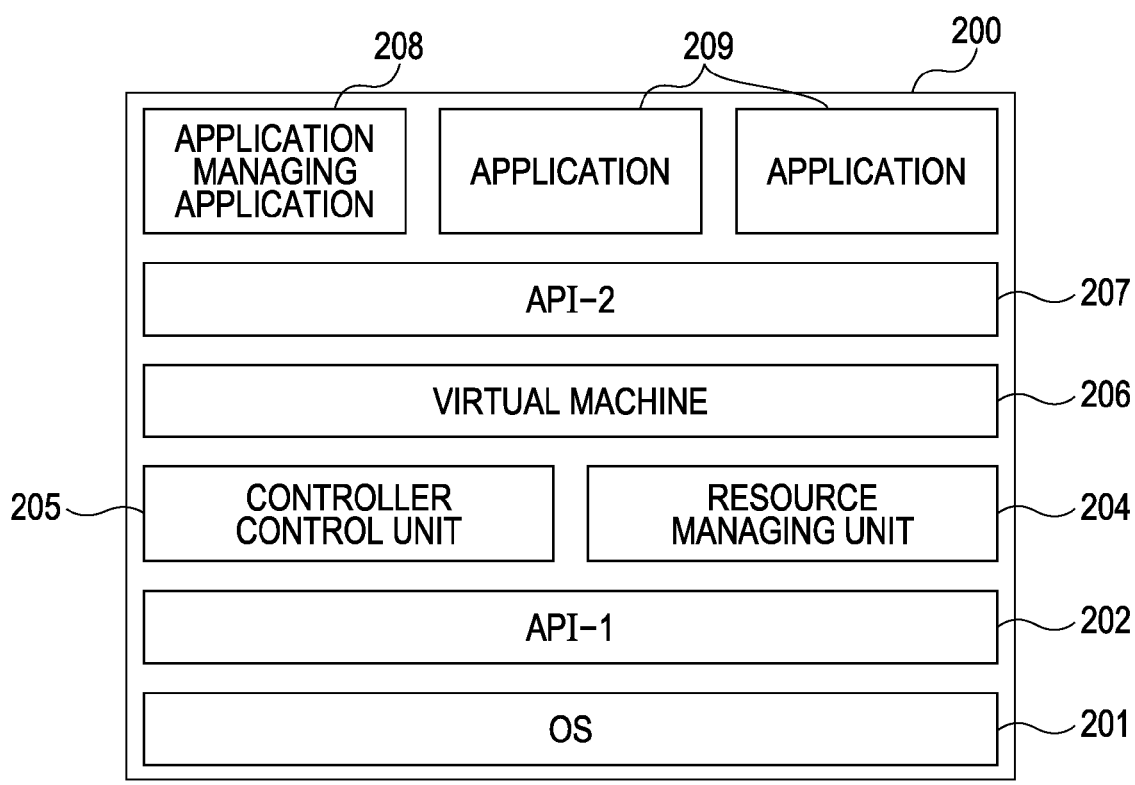
FIG. 2 is a block diagram for explaining a software configuration of an MFP illustrated in FIG. 1.

FIG. 2 is a block diagram for explaining a software configuration of the MFP 100 illustrated in FIG. 1.

In FIG. 2, reference numerals 201 to 209 denote software programs running on the MFP 100. The software programs 201 to 209 are realized when, at startup of the MFP 100, the CPU 101 reads out a program stored in the HD unit 104 or the like, loads the program into the RAM 103, and executes the program. Hereinafter, each of the software programs 201 to 209 will be described.

An OS 201 manages and controls resources of the entire MFP 100. An application control interface (API)-1 202 functions as an interface for applications running on the OS 201. Through the API-1 202, the applications running on the OS 201 can access resources on the MFP 100 and execute commands in the CPU 101.

A controller control unit 205 runs on the OS 201 to control the scanner 106, the printer 107, and the UI unit 108.

When the controller control unit 205, a virtual machine 206 (described below), and all applications running on the virtual machine 206 use resources, such as memory resources, a resource managing unit 204 restricts the use of the resources to a level below a predetermined level.

The virtual machine 206 is an execution environment most suitable for execution of a specific application. For example, the virtual machine 206 corresponds to a Java (registered trademark) virtual machine.

An API-2 207 functions as an interface which allows applications 209 running on the virtual machine 206 to use the controller control unit 205, the resource managing unit 204, the API-1 202, etc.

An application managing application 208 manages the applications 209 running on the virtual machine 206. Specifically, the application managing application 208 downloads, uploads, deletes, enables, and disables the applications 209.

Hereinafter, a configuration of the UI unit 108 illustrated in FIG. 1 will be described with reference to FIG. 3 to FIG. 5.

Figure 3:
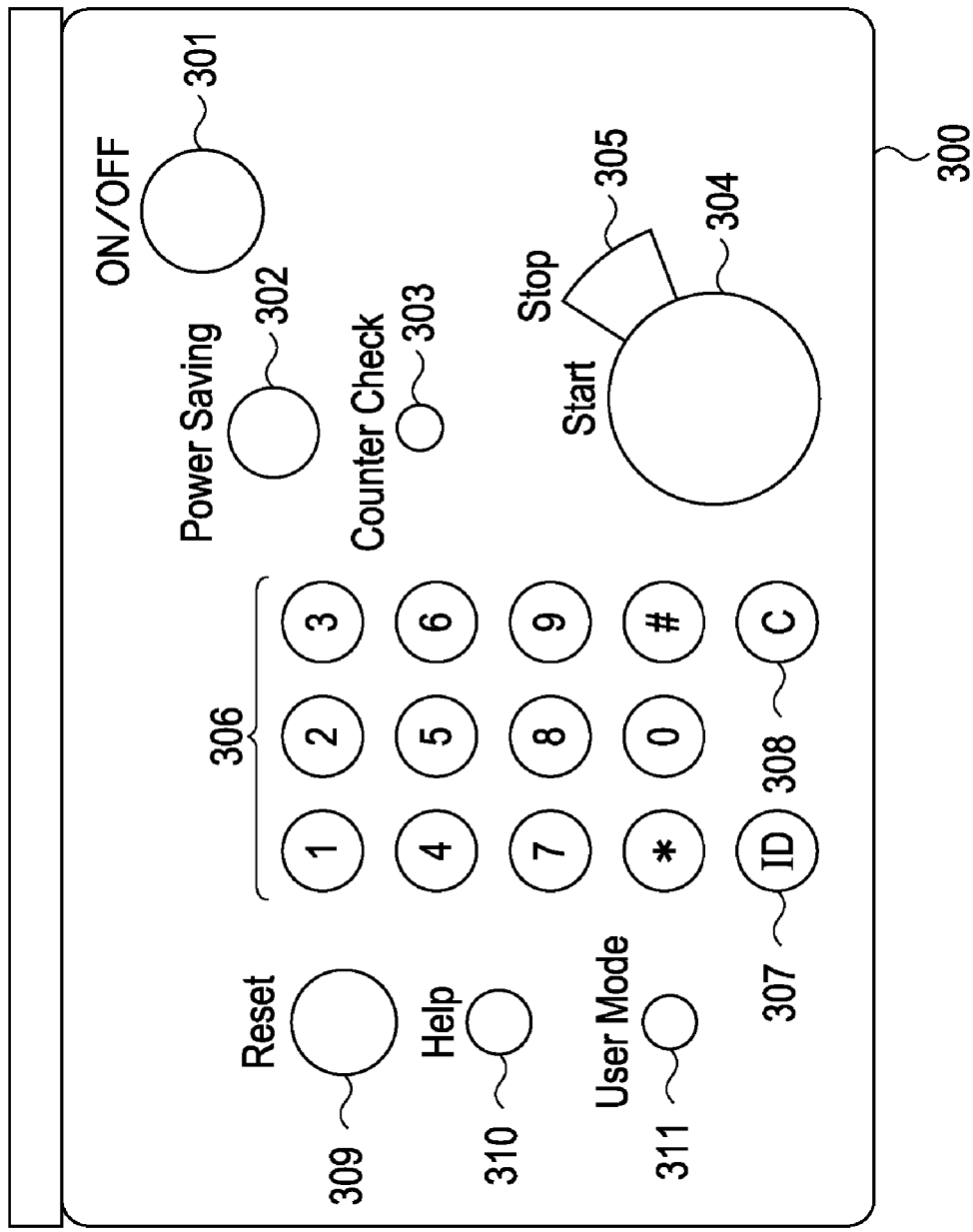
FIG. 3 illustrates a key input unit included in a user interface (UI) unit of FIG. 1.

FIG. 3 illustrates the key input unit included in the UI unit 108 of FIG. 1. FIG. 4 illustrates an example of a user interface displayed on the touch panel included in the UI unit of FIG. 1.

FIG. 3 illustrates a key input unit 300 capable of accepting user operations from hard keys.

An ON/OFF button 301 functions as a power switch. Pressing a power saving key 302 allows transition to a power saving mode. In the power saving mode, power consumption of the entire apparatus is reduced by preventing power from being supplied to some components.

Pressing a counter check key 303 displays billing counter values on a touch panel 400. The counter values are calculated on the basis of information, such as a job history and counter information stored in the HD unit 104. The display of billing counter values will be described with reference to FIG. 5.

FIG. 5 illustrates an example of billing counter values displayed on the touch panel 400 included in the UI unit 108 of FIG. 1.

As illustrated in FIG. 5, counter types and their corresponding counter values are displayed. A counter value in "total" row indicates the total number of sheets that have been ejected since installation of the MFP 100. Of the total number in "total" row, the number of sheets printed in black and white is indicated as a counter value in "black-and-white total" row, while the number of sheets not printed in black and white is indicated as a counter value in "color total" row.

Referring back to FIG. 3, a start key 304 is pressed to give an instruction to start processing, such as copying, printing, scanning, or data transmission, provided by the MFP 100. A stop key 305 is pressed to stop execution of a job started by pressing the start key 304.

Keys of a numeric keypad 306 are pressed to input numeric information. An ID key 307 is pressed to give an instruction to input authentication information. A clear key 308 is pressed to cancel information input from the numeric keypad 306.

A reset key 309 is pressed to cancel all parameters specified by the user for a job to be processed.

When uncertain about ongoing operation, the user presses a help key 310 to display information helpful for the operation. A user mode key 311 is pressed to start various setting operations.

Figure 4:
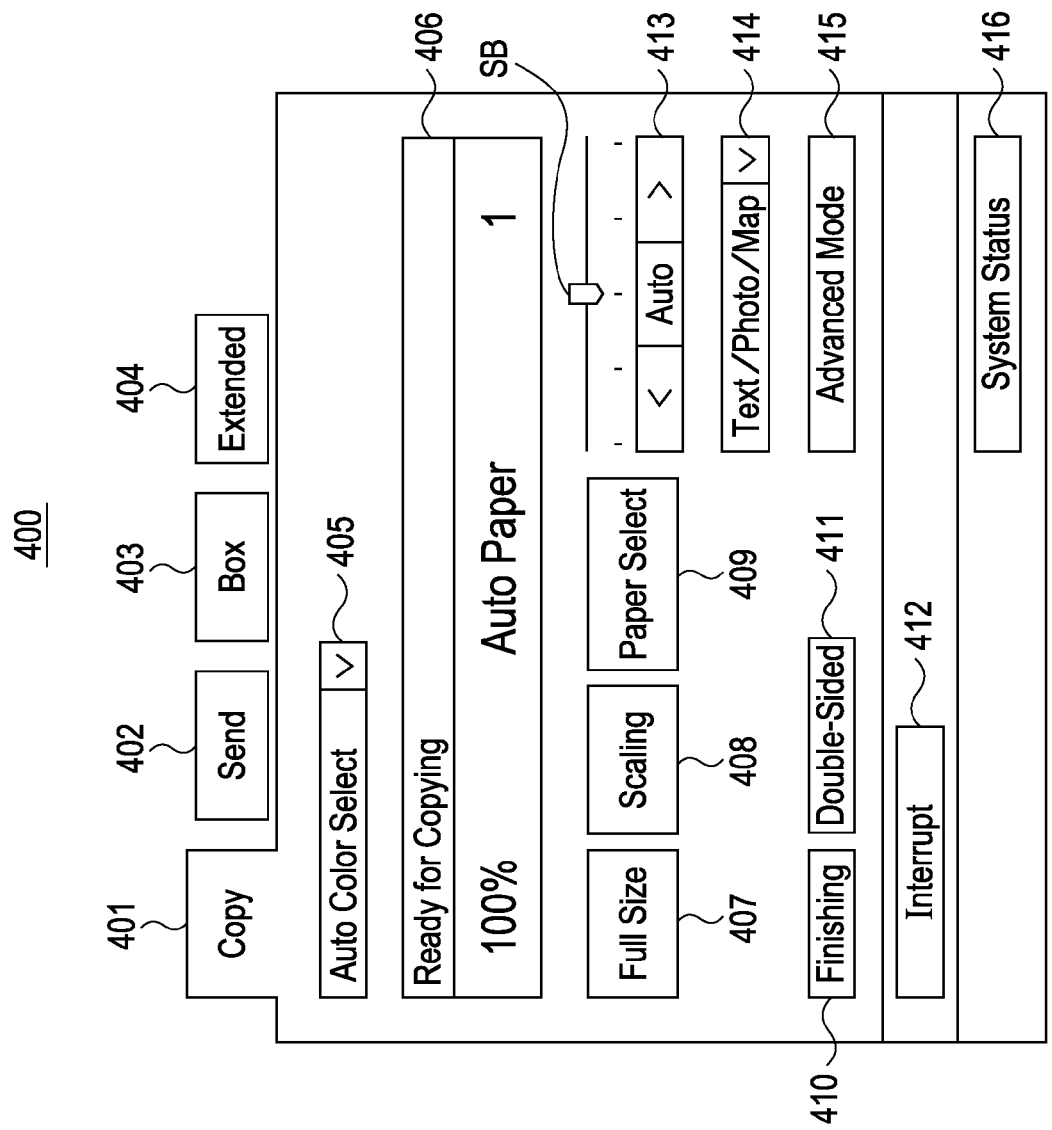
FIG. 4 illustrates an example of a user interface displayed on a touch panel included in the UI unit of FIG. 1.

Referring to FIG. 4, the touch panel 400 accepts a user operation when the user presses a specific region displayed on the screen.

A copy button 401 is pressed to perform a copying operation. A send button 402 is pressed to perform transmission processing. A box button 403 is pressed to perform processing related to a box function.

An extended key 404 is pressed to display a screen related to extended functions (e.g., the applications 209 of FIG. 2). A color-selection list box 405 is used to select one of "auto select", "color", "black and white", etc.

A status display field 406 displays information to be viewed by the user. In the example of FIG. 4, the status display field 406 displays a message indicating whether the MFP 100 is ready for copying, a scaling factor, a paper selection method, and the number of copies. A full size button 407 is used to select full size copying. A scaling button 408 is used to specify a scaling factor for image formation.

A paper select button 409 is used to specify a paper feed source. A finishing button 410 is used to select a finishing option, specify whether to execute sorting, etc.

A double-sided button 411 is used to specify which of single-sided and double-sided options to select for scanning or printing of an original. An interrupt button 412 is used to interrupt a job in progress and allow a new job to start.

A density adjusting button 413 is used to move a slide bar SB to adjust the print density. A button 414 is used to specify an attribute of an original to be scanned. For example, the attribute of an original can be selected from such options as text, photo, and map.

An advanced mode button 415 is pressed to give complex instructions, for example, for specifying settings of cover and inserted sheets, binding, OHP insertion, and margin size.

A system-status display button 416 is pressed to display a status of each component of the MFP 100 and job history information recorded in the MFP 100.

Figure 6:
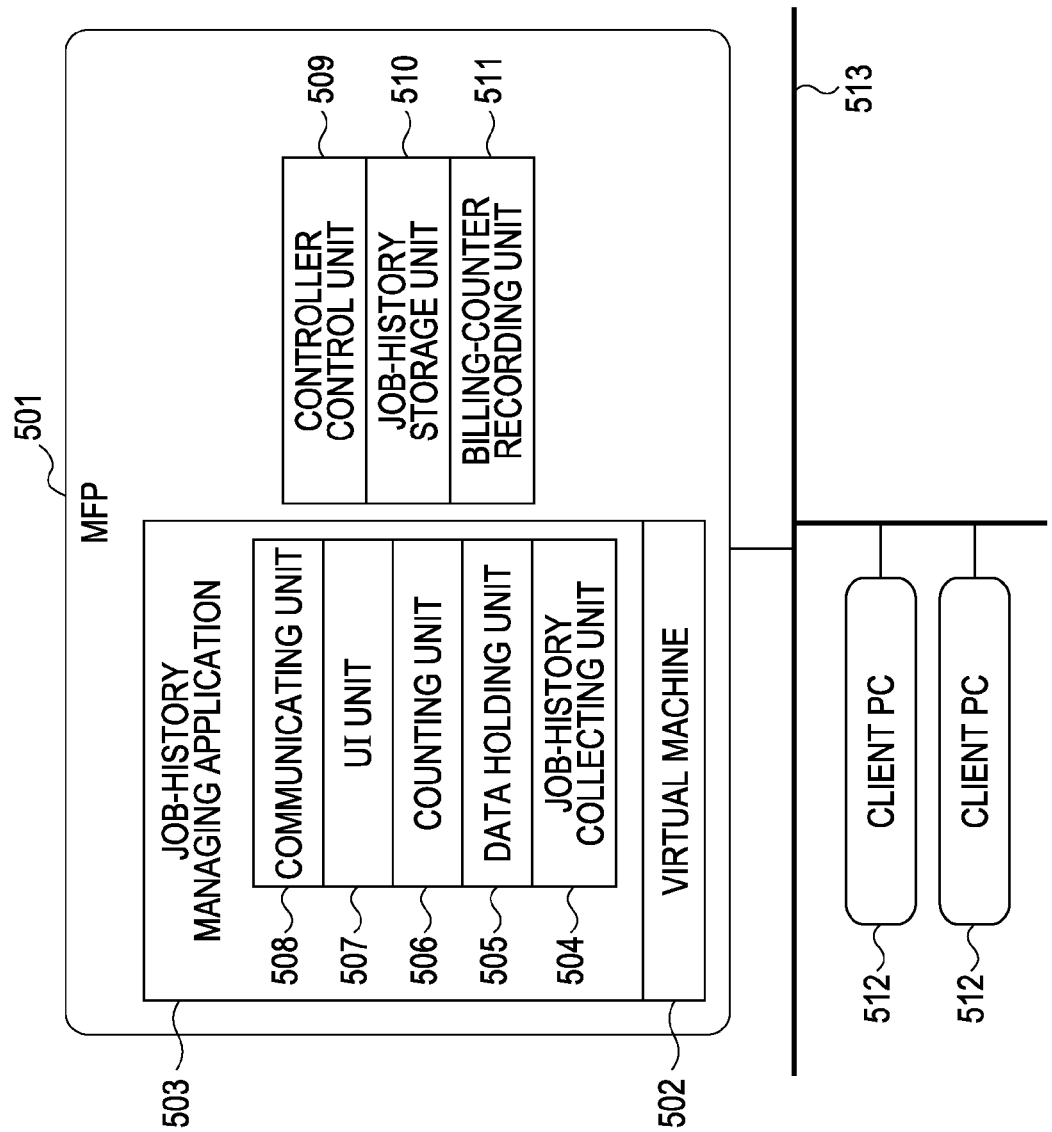
FIG. 6 illustrates an example of a system to which an MFP according to an exemplary embodiment of the present invention is applicable.

FIG. 6 illustrates an example of a system to which an MFP of the present exemplary embodiment is applicable. In this example, a description will be given about a configuration of a client PC connected to the MFP via a network, and a configuration of an application running on a virtual machine of the MFP according to the present exemplary embodiment.

An MFP 501 illustrated in FIG. 6 corresponds to the MFP 100 of FIG. 1. The MFP 501 includes a virtual machine 502, a job-history managing application 503, and a controller control unit 509. The virtual machine 502 corresponds to the virtual machine 206 illustrated in FIG. 2. The job-history managing application 503 is an example of the applications 209 illustrated in FIG. 2. The controller control unit 509 corresponds to the controller control unit 205 illustrated in FIG. 2.

That is, the virtual machine 502, the job-history managing application 503, and the controller control unit 509 are realized when, at startup of the MFP 501, the CPU 101 loads a program stored in the HD unit 104 into the RAM 103, and executes the program.

The controller control unit 509 performs various kinds of processing, including job execution, for controlling the MFP 501. For example, while a job is in progress, each time a sheet is ejected, the controller control unit 509 adds up and records the total number of ejected sheets in a billing-counter recording unit 511 (i.e., each time the MFP 501 performs printing, the controller control unit 509 counts up the billing counter value stored in the billing-counter recording unit 511). Upon completion of the job, the controller control unit 509 stores the corresponding job history in a job-history storage unit 510.

The job-history storage unit 510 and the billing-counter recording unit 511 are configured as a storage area in the nonvolatile storage medium (HD unit 104). The contents of the job-history storage unit 510 and billing-counter recording unit 511 are sequentially updated according to the state of job processing executed under control of the controller control unit 509.

In the job-history managing application 503, a job-history collecting unit 504 collects a job history from the job-history storage unit 510 periodically or each time a job history is generated, and records the collected job history in a data holding unit 505.

The data holding unit 505 holds job histories and billing counter values obtained from the billing-counter recording unit 511 at counting times. The data holding unit 505 is configured as a storage area in the nonvolatile storage medium (HD unit 104). The data holding unit 505 is configured to be accessible by the controller control unit 509.

For example, once a month at a predetermined time, a counting unit 506 obtains billing counter values held by the data holding unit 505, scans job histories, and calculates the number of pages printed during a target period for each user (hereinafter, the resulting data is referred to as a summary table). Here, the predetermined time (counting time) may either be set directly on the UI unit 108 or by the client PC 512 via a network 513.

In response to an input request from the user, a UI unit 507 displays, on the touch panel 400, job histories, billing counter values, and a counting result for each user. A communicating unit 508 responds to a request from a web browser etc. operated on a client computer by the user. In response to the request, the communicating unit 508 converts job histories, billing counter values, and a summary table into hypertext markup language (HTML) format and sends them out. The format may not necessarily be HTML format, and may be extensible markup language (XML) format, comma separated value (CSV) format, or the like. The summary table contains, for example, a cutoff date and time, and job histories and billing counter values for a predetermined counting period. The summary table may be generated by an external apparatus which collects job histories and counter information on the basis of a cutoff date.

The user uses a client PC 512 to operate an application, send a print request to the MFP 501, and view job histories and a summary table through an Internet browser. The above-described configuration is just an example of a system configuration.

The MFP 501 may be configured as a printer. An interface bus may either be a physical communication medium or a logical interface configured as software for message communication.

Each of the functional blocks described above may execute its function when the CPU 101 executes a program, or may be implemented in a hardware circuit.

Figure 8:
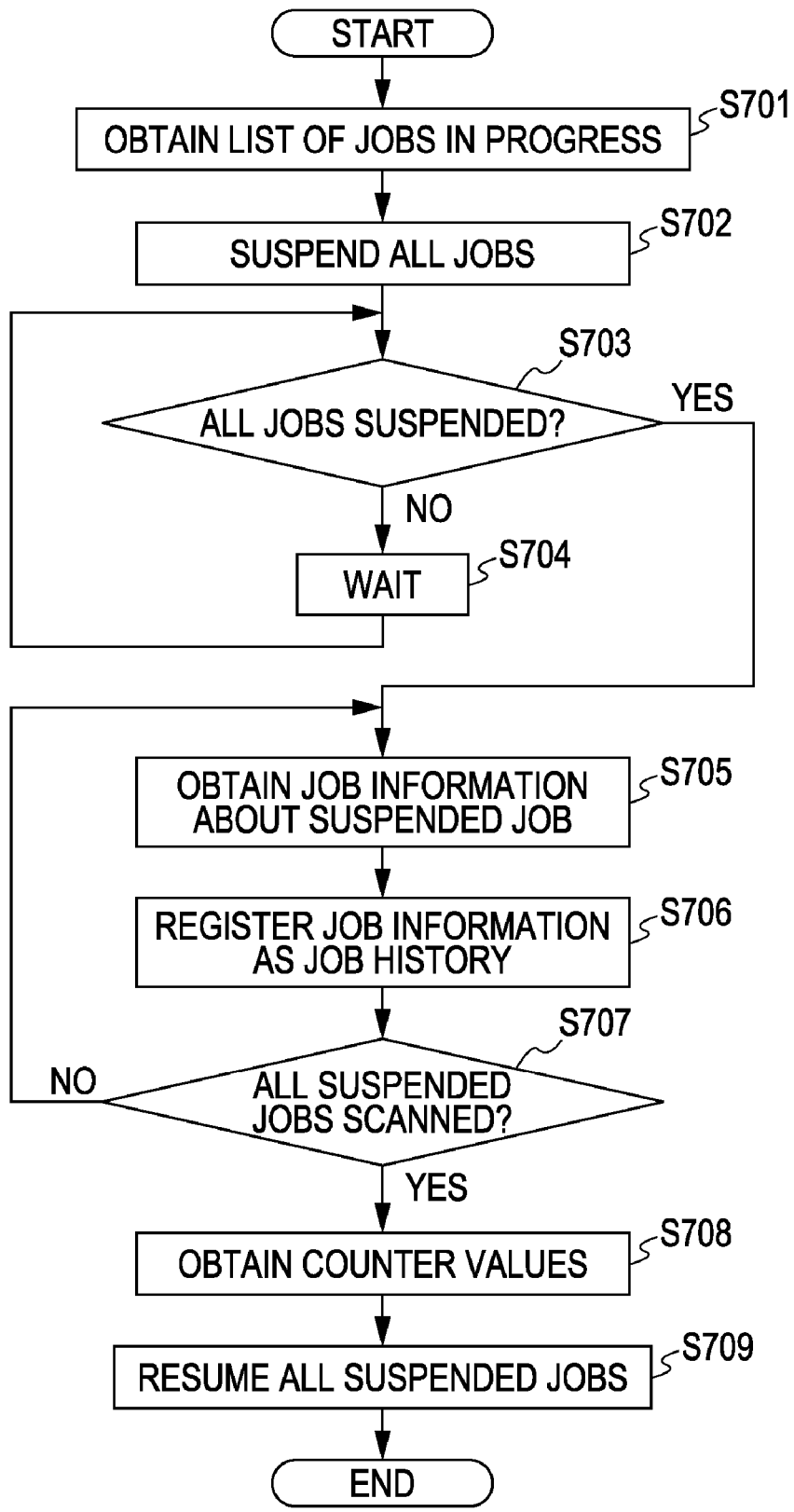
FIG. 8 is a flowchart illustrating an example of a first data processing procedure in a printing apparatus according to an exemplary embodiment of the present invention.
Figure 12:
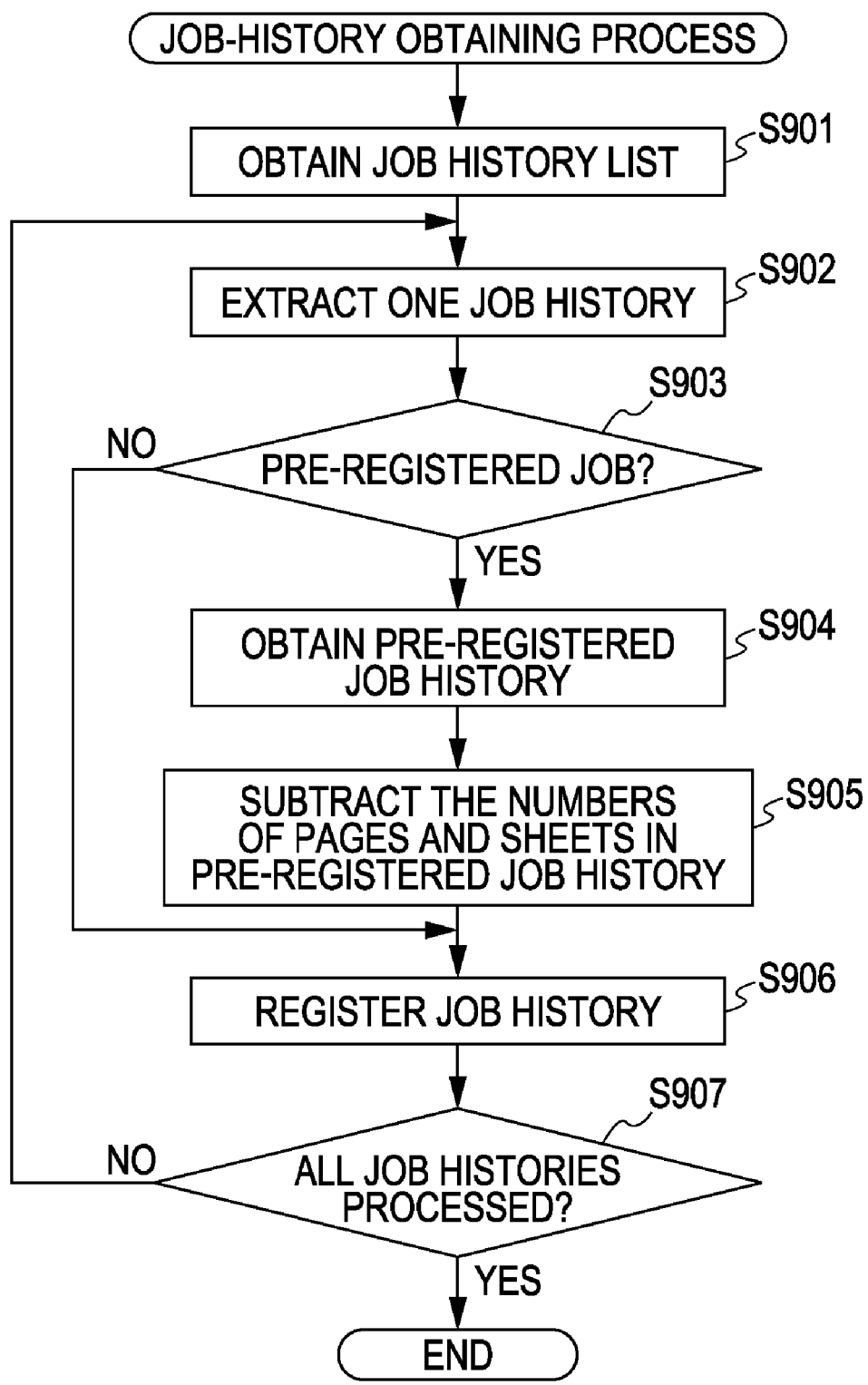
FIG. 12 is a flowchart illustrating an example of a second data processing procedure in a managing apparatus according to an exemplary embodiment of the present invention.
Figure 16:
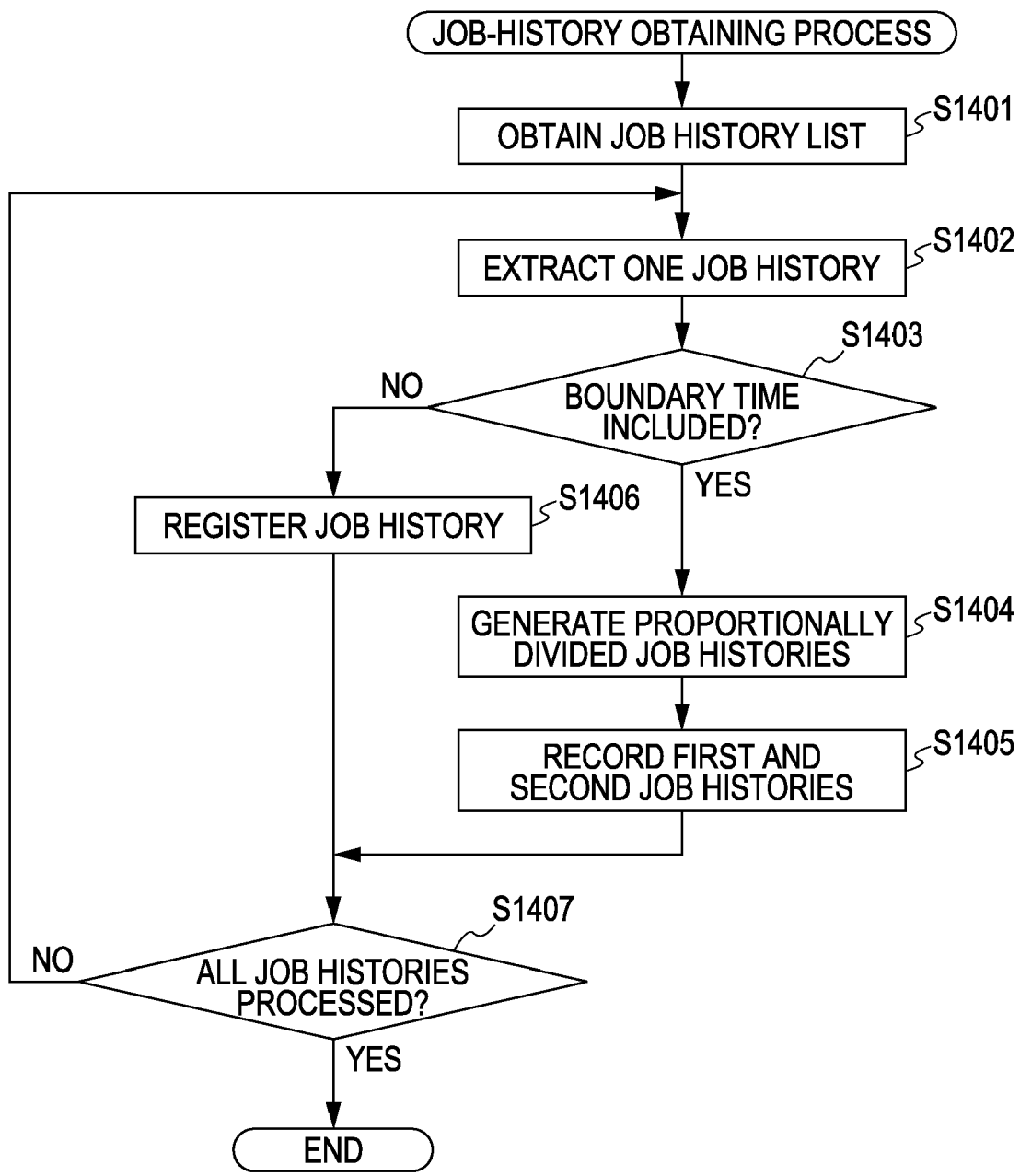
FIG. 16 is a flowchart illustrating an example of a third data processing procedure in a managing apparatus according to an exemplary embodiment of the present invention.

The functions provided by the job-history managing application 503 and the controller control unit 509 and illustrated in FIG. 8, FIG. 12, and FIG. 16 may be provided in an information processing apparatus (print managing apparatus) connected to the MFP 501.

FIG. 7 illustrates an example of a counting-time setting screen serving as a user interface displayed by the UI unit 507 of FIG. 6. The example illustrated in FIG. 7 is an example of a dialog for counter cutoff setting.

Referring to FIG. 7, a list box 601 is used to specify a counting date, and a list box 602 is used to specify a counting time. An OK button 603 is used to give an instruction to update and terminate the setting. A cancel button 604 is used to give an instruction to terminate the setting without updating it.

In the example of FIG. 7, "20" and "17:00" are set in the list box 601 and the list box 602, respectively. This means that a counter cutoff process illustrated in FIG. 8 is scheduled to be performed at 17:00 on the 20th of each month.

Hereinafter, a counter cutoff process according to an exemplary embodiment of the present invention will be described with reference to a flowchart.

FIG. 8 is a flowchart illustrating an example of a first data processing procedure in a printing apparatus according to the present exemplary embodiment. FIG. 8 corresponds to an example of a counter cutoff process performed by the controller control unit 509 at a predetermined cutoff date and time. The process of this flowchart is realized when the CPU 101 loads a program stored in the HD unit 104 or the like into the RAM 103, and executes the program.

The controller control unit 509 starts the process of the flowchart of FIG. 8 at a counting time (cutoff date and time) specified on the counting setting screen illustrated in FIG. 7.

Figure 9:
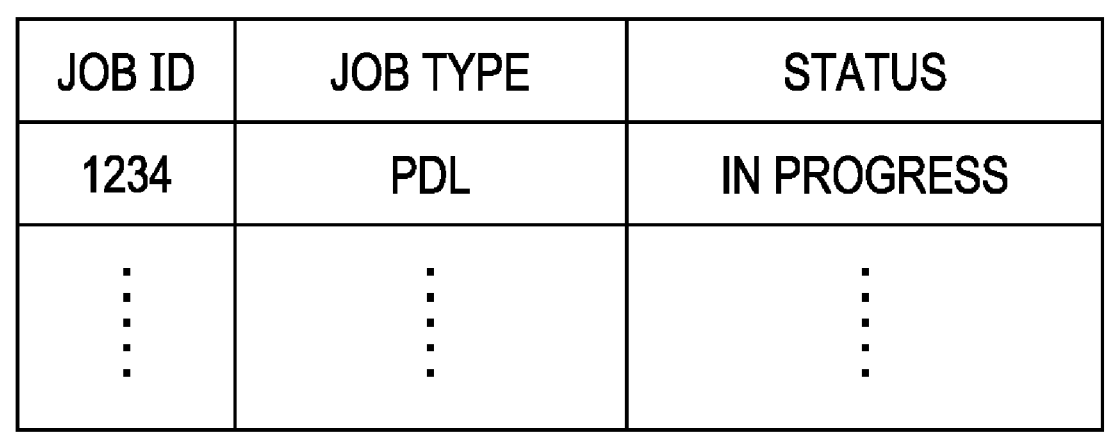

In step S701, the controller control unit 509 obtains a list of jobs in progress, the jobs currently being executed by the MFP 501. The list is managed in a job management table in the work area of the RAM 103. An example of part of information obtained by the controller control unit 509 in step S701 is illustrated in FIG. 9. In this example, the job ID, job type, and status of the current job are presented in a table format. The job ID is identification information for uniquely identifying the job.

Next, in step S702, the controller control unit 509 issues a suspend command to all the jobs obtained in step S701. Thus, the status in the job information transitions to a "suspended" state.

In step S703, the controller control unit 509 determines whether all the jobs have been suspended. If the controller control unit 509 determines that at least one of the jobs is still in progress and not all the jobs have been suspended (No in step S703), the process proceeds to step S704.

In step S704, the controller control unit 509 waits (i.e., stays in a standby state) for a certain period of time, such as about one second. Then, the process returns to step S703.

On the other hand, if the controller control unit 509 determines in step S703 that all the jobs have been suspended (Yes in step S703), the process proceeds to step S705.

In step S705, the controller control unit 509 obtains job information about a job in "suspended" state, the job information being managed in the RAM 103.

An example of job information obtained by the job-history collecting unit 504 is illustrated in FIG. 10.

FIG. 10 illustrates an example of job information obtained by the job-history collecting unit 504 of FIG. 6. The end time, which has not yet been reached, is indicated by a "–" sign.

The job information illustrated in FIG. 10 contains such items as job ID, status, start time, end time, user name, department name, the number of logical faces, paper size, the number of ejected sheets, the number of faces, page layout, color mode, and print side. The number of logical faces indicates the number of pages set for the job. The number of faces is incremented by one for each ejected sheet in single-sided printing, and incremented by two for each ejected sheet in double-sided printing.

Referring back to the flowchart of FIG. 8, in step S706, the controller control unit 509 records the job information (job execution information) obtained in step S705 as a job history in the data holding unit 505. The current time at this point is set as the end time of the job. When recording the job history in the data holding unit 505, the controller control unit 509 assigns a serial number, called a job-history record number, to the job history. Although a detailed description will be given below, a job history recorded in the job-history storage unit 510 is also assigned a job-history record number. Therefore, for identification purposes, a number in the job-history storage unit 510 is referred to as a job-history record number A, and a number in the data holding unit 505 is referred to as a job-history record number B. An example of a job history recorded in the data holding unit 505 is illustrated in FIG. 11. A job ID ("1234" in this example) for a job history registered in the data holding unit 505 is recorded, by the controller control unit 509, on a pre-registered job list in the data holding unit 505.

In step S707, the controller control unit 509 determines whether all the suspended jobs have been processed. If it is determined that at least one of the suspended jobs has not yet been processed (No in step S707), the process returns to step S705, where the next suspended job is processed.

On the other hand, if it is determined in step S707 that all the suspended jobs have been processed (Yes in step S707), the controller control unit 509 advances the process to step S708.

In step S708, the controller control unit 509 obtains billing counter values managed by the billing-counter recording unit 511 and records the obtained values in the data holding unit 505.

In step S709, the controller control unit 509 resumes all the suspended jobs, and ends the process of the flowchart of FIG. 8.

In the counter cutoff process described above, even when a job is processed over a period of time before and after a cutoff date and time (counting time), a job history (1/2) is generated from the content processed by the cutoff date and time (first generation process), and can be registered in the data holding unit 505.

Upon completion of the jobs resumed in step S709, their job histories are stored in the job-history storage unit 510 by the controller control unit 509. In the job-history storage unit 510, only one job history is stored for each print job. At this timing, the job-history managing application 503 reads this job history from the job-history storage unit 510, generates a job history (2/2) which is the latter part following the job history (1/2) registered in the data holding unit 505 in step S706 of FIG. 8 (second generation process), and registers the job history (2/2) in the data holding unit 505.

Hereinafter, a process of the job-history managing application 503 will be described with reference to a flowchart of FIG. 12.

FIG. 12 is a flowchart illustrating an example of a second data processing procedure in a managing apparatus according to the present exemplary embodiment. In this process, the job-history managing application 503 generates the latter job history following the first job history registered in the data holding unit 505. The process of this flowchart is realized when the CPU 101 loads a program stored in the HD unit 104 or the like into the RAM 103, and executes the program.

The job-history managing application 503 starts the process of the flowchart upon detecting that a job history not registered by the job-history managing application 503 in the data holding unit 505 has been recorded in the job-history storage unit 510. For detection, the job-history managing application 503 may send a request in advance to the controller control unit 509 such that notification can be received from the controller control unit 509 each time a new job history is recorded in the job-history storage unit 510 by the controller control unit 509. Alternatively, the job-history managing application 503 may perform polling (i.e., periodically refer to the job-history storage unit 510) to detect that a new job history has been recorded in the job-history storage unit 510.

First, in step S901, from the job-history storage unit 510, the job-history collecting unit 504 of the job-history managing application 503 obtains, as a job history list, all job histories not registered in the data holding unit 505. For example, the job-history record number A can be used to identify a job that is not registered in the data holding unit 505.

Specifically, the job-history record number A is a numeric value incremented by the processing of the controller control unit 509 each time a job history is recorded in the job-history storage unit 510. The job-history record number A is recorded in the job-history storage unit 510 together with the job history. The job-history record number B is used when a job history is recorded in the data holding unit 505 (step S706 of FIG. 8).

When a job history is registered in the data holding unit 505, the job-history collecting unit 504 records, in the data holding unit 505, the job-history record number B last registered in the data holding unit 505.

Therefore, by comparing the latest job-history record number B recorded in the data holding unit 505 with the job-history record number A stored in the job-history storage unit 510, the job-history collecting unit 504 can calculate the difference therebetween.

Then, on the basis of the calculated difference, the job-history collecting unit 504 obtains a job history stored in the job-history storage unit 510.

Next, in step S902, the job-history collecting unit 504 extracts one job history from the job history list obtained in step S901. An example of this job history is illustrated in FIG. 13.

FIG. 13 illustrates an example of a job history extracted by the counting unit 506 of FIG. 6.

In the job history illustrated in FIG. 6, the status is indicated as "completed after suspended", because a job having a job ID "1234" is successfully completed after being suspended and resumed in step S709 of FIG. 8. As shown, the number of ejected sheets reaches "100".

In step S903, the job-history collecting unit 504 determines whether the job history extracted in step S902 exists in the pre-registered job list registered in the data holding unit 505 in step S706 of FIG. 8. For example, in the present exemplary embodiment, this determination is made on the basis of whether a job ID in the job history extracted in step S902 is on the pre-registered job list.

If the job-history collecting unit 504 determines that the job history extracted in step S902 exists in the pre-registered job list registered in the data holding unit 505 in step S706 of FIG. 8 (Yes in step S903), the job-history collecting unit 504 advances the process to step S904. On the other hand, if the job-history collecting unit 504 determines that the job history extracted in step S902 does not exist in the pre-registered job list (No in step S903), the job-history collecting unit 504 advances the process to step S906.

In step S904, on the pre-registered job list registered in the data holding unit 505 in step S706 of FIG. 8, the job-history collecting unit 504 identifies a job ID of the corresponding job, and obtains a job history containing this job ID from the data holding unit 505.

In step S905, the job-history collecting unit 504 performs processing (subtraction) to subtract the numbers of ejected sheets and faces (pages) in the job history obtained in step S904 from the corresponding numbers in the job history extracted in step S902. For example, if the job history extracted in step S902 is in the state of FIG. 13 and the job history obtained in step S904 is in the state of FIG. 11, a subtraction "100–70" is performed in step S905. Thus, the resulting numbers of printed sheets and faces in the job history are both "30".

In step S906, the job-history collecting unit 504 registers, in the data holding unit 505, the job history extracted in step S902 and subjected to subtraction in step S905. For example, to clearly indicate that the pre-registered job history and the job history registered in step S906 correspond to two different periods of the same execution job, the job-history collecting unit 504 may change their statuses to "completed (1/2)" and "completed (2/2)" upon successful completion.

If No in step S903 and the process proceeds to step S906, the job history extracted in step S902 is registered in the data holding unit 505 without change.

In step S907, the job-history collecting unit 504 determines whether all the job histories on the job history list obtained in step S901 have been processed. If it is determined that there is still at least one unprocessed job history (No in step S907), the process returns to step S902, where another job history is extracted.

On the other hand, if it is determined in step S907 that all the job histories on the job history list obtained in step S901 have been processed (Yes in step S907), the job-history collecting unit 504 ends the process of the flowchart of FIG. 12.

With the process described above, even when a job is processed over a period of time before and after a cutoff date and time (counting time), a job history of the job processed in the period from the cutoff date and time to completion of the job can be registered separately as a job history (2/2) in the data holding unit 505.

Thus, it is possible to match, in a target counting period, the sum of the numbers of printed sheets in job histories and an increment of a billing counter.

FIG. 14 illustrates an example of a job history list registered in the data holding unit 505. This example corresponds to a job history list including the job histories recorded in step S706 of FIG. 8 and step S906 of FIG. 12. In the example of FIG. 14, only job history items related to the present invention are presented.

In FIG. 14, a job history number is a serial number incremented each time a job history is recorded. The job history number in FIG. 14 corresponds to the job-history record number B described above.

A job ID allows unique identification of an execution job. Job histories with job history numbers "11234" and "11235" have the same job ID "1234". This shows that these two job histories correspond to the same execution job.

The job history with the job history number "11234" is an example of the job history pre-registered in step S706 of FIG. 8. The job history with the job history number "11235" is an example of the job history registered in step S906 of FIG. 12.

The statuses in the job histories having the job history numbers "11234" and "11235" are indicated with parentheses, such as "completed (1/2)" and "completed (2/2)", respectively. This shows that a single execution job is divided into two parts.

In a job history having a job history number "11232", the status is indicated as "stop". This shows that the job is cancelled or interrupted during execution.

Thus, by taking into consideration a job that is in progress at a counting time, it is possible to match the job history and counter information and store them in the data holding unit 505.

Then, the counting unit 506 performs count processing on the basis of job histories and counter values that match each other and are stored in the data holding unit 505. Thus, it is possible to achieve accurate counting, cost analysis, and billing.

In the first exemplary embodiment described above, the counter cutoff process illustrated in FIG. 8 is executed at each counting date and time that is set on the counting-time setting screen of FIG. 7. Alternatively, the counter cutoff process may be executed at specified time intervals, such as every 30 minutes.

In the first exemplary embodiment, the counting-time setting screen of FIG. 7 is configured such that counting is performed once a month. Alternatively, the counting-time setting screen may be configured such that counting is performed once an hour, that is, x minutes past the hour (x is in the range 0 to 59).

FIG. 15 illustrates an example of a counting-time setting screen according to a second exemplary embodiment of the present invention.

Referring to FIG. 15, a list box 1301 is used to select a value of minutes at which a job history is obtained each hour. An OK button 1302 is used to give an instruction to update and terminate the setting. A cancel button 1303 is used to give an instruction to terminate the setting without updating it.

In the display example of FIG. 15, a value "05" is specified in the list box 1301. In this case, the counter cutoff process of FIG. 8 is performed at five minutes past the hour. This setting allows accurate determination of the number of ejected sheets per unit time.

In the example of FIG. 15, a counter cutoff process is executed once an hour at specified minutes past the hour. Alternatively, the counter cutoff process may be executed once a day at x hours (x is in the range 0 to 23).

In the first and second exemplary embodiment described above, a job history is divided by suspending the job. In a third exemplary embodiment, however, a job history is divided without suspending the job.

In the present exemplary embodiment, in the counter cutoff process of FIG. 8, the controller control unit 509 executes step S706 only. That is, at a counting time (cutoff date and time) specified on the counting-time setting screen of FIG. 7 or FIG. 15, the controller control unit 509 obtains billing counter values managed by the billing-counter recording unit 511, and records the obtained values in the data holding unit 505 (step S708 of FIG. 8).

Thus, when the controller control unit 509 performs a counter cutoff process at a predetermined cutoff date and time, billing counter values at the cutoff date and time can be stored in the data holding unit 505.

Upon completion of a job, the controller control unit 509 stores its job history in the job-history storage unit 510. Even when the job was executed over a period of time before and after a cutoff date and time (counting time), the job history is stored as a single job history in the job-history storage unit 510.

Periodically or each time a job history is stored in the job-history storage unit 510 as described above, the job-history collecting unit 504 of the job-history managing application 503 collects the job history from the job-history storage unit 510 and registers the job history in the data holding unit 505. For a job executed over a period of time before and after a cutoff date and time (counting time), the job-history collecting unit 504 registers the job history as a plurality of separate job histories in the data holding unit 505. This processing in the job-history storage unit 510 is illustrated in FIG. 16.

FIG. 16 is a flowchart illustrating an example of a third data processing procedure in a managing apparatus according to the present exemplary embodiment. FIG. 16 corresponds to a job-history obtaining process performed by the job-history managing application 503. The process of this flowchart is realized when the CPU 101 loads a program stored in the HD unit 104 or the like into the RAM 103, and executes the program. In this example, on the counting-time setting screen illustrated in FIG. 15, the counting time is set in hours instead of minutes. For example, on the dialog illustrated in FIG. 15, a time of x hours (x:00) is specified by the user as a boundary time (counting time). In this example, the value of x is currently set to "16".

In step S1401 of FIG. 16, from the job-history storage unit 510, the job-history collecting unit 504 obtains a job history list of job histories not stored in the data holding unit 505.

In step S1402, the job-history collecting unit 504 extracts one job history from the job history list obtained in step S1401.

In step S1403, the job-history collecting unit 504 determines whether a set boundary time (counting time) is included in a period between start and end times in the job history extracted in step S1402.

For example, in terms of hours and minutes only, if the start time and the end time are "15:30" and "16:20", respectively, and the boundary time is "16:00" in the job history extracted in step S1402, the boundary time "16:00" is included in the period between the start time "15:30" and the end time "16:20".

If the job-history collecting unit 504 determines that the set boundary time is included (Yes in step S1403), the job-history collecting unit 504 advances the process to step S1404.

In step S1404, the job-history collecting unit 504 proportionally divides the number of ejected sheets and the number of logical faces (pages) in the job history using the following equations (1) and (2). This allows the counting unit 506 to calculate the number of ejected sheets and the number of logical faces in each of separate job histories. A fractional portion of a value obtained by equation (1) is dropped. Although only the equations for proportionally dividing the number of ejected sheets are shown below, the same equations can be used to proportionally divide the number of logical faces:

(Number of ejected sheets in first job history)=(Total number of ejected sheets)×(Time period between start time and boundary time)÷(Total time period required for job)   Equation (1)

(Number of ejected sheets in second job history)= (Total number of ejected sheets)−(Number of ejected sheets in first job history)   Equation (2)

That is, a job history of a print job that is in progress at a counting time is proportionally divided according to the ratio between the time period from the start time to counting time of the print job and the time period from the counting time to end time of the print job.

For example, in a job history, if the start time is "15:30", the end time is "16:20", the number of ejected sheets is "100", the number of faces is "100", and the boundary time is "16:00", the above equations (1) and (2) give "60" as the number of ejected sheets in the first job history and "40" as the number of ejected sheets in the second job history. Likewise, the number of faces in the first job history "60" and the number of faces in the second job history "40" are obtained. The job-history collecting unit 504 sets the boundary time (counting time) as the end time in the first job history, and sets the boundary time (counting time) as the start time in the second job history.

In step S1405, the job-history collecting unit 504 records the first job history and the second job history in the data holding unit 505. Then, the process proceeds to step S1407.

If it is determined in step S1403 that the set boundary time is not included (No in step S1403), the process proceeds to step S1406. In step S1406, the job-history collecting unit 504 records, in the data holding unit 505, the job history extracted in step S1402 without change.

In step S1407, the job-history collecting unit 504 determines whether all the job histories obtained in step S1401 have been processed.

If it is determined that there is still at least one unprocessed job history (No in step S1407), the job-history collecting unit 504 returns the process to step S1402 and extracts another job history.

On the other hand, if it is determined in step S1407 that all the job histories obtained in step S1401 have been processed (Yes in step S1407), the job-history collecting unit 504 ends the process of the flowchart of FIG. 16.

With the process described above, even when a job is executed over a period of time before and after a cutoff date and time (counting time), a job history of the job can be recorded as a plurality of separate job histories without suspending execution of the job, so that the job histories correspond to the billing counter.

As described above, it is possible to match, in a target counting period, the sum of the numbers of printed sheets in job histories and an increment of the billing counter. Thus, accurate counting, cost analysis, and billing can be achieved.

The configuration and content of various types of data are not limited to those described above, and can be modified variously according to the purpose and application.

While some exemplary embodiments have been described above, the present invention can be implemented in the form of a system, apparatus, method, program, or computer-readable storage medium. Specifically, the present invention is applicable either to a system including a plurality of devices, or to an apparatus including a single device.

Hereinafter, a configuration of a data processing program readable by a printing apparatus according to an exemplary embodiment of the present invention will be described with reference to a memory map illustrated in FIG. 17.

FIG. 17 is a diagram for explaining a memory map of a storage medium for storing various data processing programs readable by a printing apparatus according to an exemplary embodiment of the present invention.

Although not specifically shown, information, such as version information and a creator name, for managing a program group stored in the storage medium is also stored. Additionally, information dependent on an OS or the like on the program read side, such as an icon for displaying a program in an identifiable manner, may also be stored.

Data belonging to various programs is managed by a directory. A program for installing various programs onto a computer and, if a program to be installed is compressed, a program for decompressing the program may also be stored.

The functions illustrated in FIG. 8, FIG. 12, and FIG. 16 of the above-described exemplary embodiments may be carried out by a host computer according to a program externally installed. In this case, the present invention is applied even to the case where an information group including a program is supplied to an output apparatus from a storage medium, such as a compact-disk read-only memory (CD-ROM), a flash memory, or a floppy disk (FD) or from an external storage medium via a network.

As described above, a storage medium in which software program code having computer-executable instructions for realizing the functions of the above-described exemplary embodiments is recorded is supplied to a system or an apparatus. The present invention can be provided when a computer (or a CPU or microprocessing unit (MPU)) of the system or apparatus reads and executes the program code stored in the storage medium.

In this case, the program code read out of the storage medium realizes the novel functions of the present invention. Therefore, the storage medium storing the program code constitutes an aspect of the present invention.

The program may take any form, as long as it serves as a program. For example, the program may be object code, a program executed by an interpreter, or script data supplied to the OS.

Examples of a storage medium for supplying the program may include, but are not limited to, a flexible disk, a hard disk, an optical disk, a magneto-optical (MO) disk, a CD-ROM, a CD-recordable (CD-R), a CD-rewritable (CD-RW), a magnetic tape, a nonvolatile memory card, a ROM, and a digital versatile disk (DVD).

In this case, the program code read out of the storage medium realizes the functions of the above-described exemplary embodiments. Therefore, the storage medium storing the program code constitutes an aspect of the present invention.

A program according to an exemplary embodiment of the present invention may be supplied by connecting to a homepage on the Internet using a browser on a client computer, and downloading the program or a compressed file including an automatic installation function from the homepage into a storage medium, such as a hard disk. Program code constituting the program may be divided into a plurality of files, and these files may be downloaded from different homepages. That is, aspects of the present invention may include a World Wide Web (WWW) server and a file transfer protocol (ftp) server which allow a plurality of users to download program files for realizing the functional processing according to an exemplary embodiment of the present invention onto a computer.

A program according to an exemplary embodiment of the present invention may be encrypted, stored in a storage medium, such as a CD-ROM, and distributed to users. In this case, a user who satisfies predetermined conditions may be allowed to download key information for decryption from a homepage via the Internet, execute the encrypted program using the key information, and install the program onto a computer.

As described above, the functions of the above-described exemplary embodiments are realized by executing the program code read out by a computer. Additionally, for example, in accordance with an instruction of the program code, an OS running on the computer may perform all or a part of the actual processing, so that the functions of the above-described exemplary embodiments are realized by this processing.

Furthermore, after the program code is read out of a storage medium, it can be written to a function expansion board inserted in the computer or to a memory provided in a function expansion unit connected to the computer. A CPU or the like mounted on the function expansion board or function expansion unit may perform all or a part of the actual processing, so that the functions of the above-described exemplary embodiments are realized by this processing.

The present invention is not limited to the exemplary embodiments described above, and various modifications (including organic combinations of the exemplary embodiments) may be made on the basis of the spirit of the invention. These modifications are not excluded from the scope of the present invention.

Various examples and exemplary embodiments of the present invention have been described. It is to be understood by those skilled in the art that the spirit and scope of the present invention are not limited to a specific description of the present specification.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-120511 filed May 2, 2008, which is hereby incorporated by reference herein in its entirety.

What is claimed is:

1. A print managing method comprising:
    storing, each time a print job is completed, a job history of the print job in a job-history storage unit;
    counting up, each time printing is performed, counter information recorded in a counter recording unit; and
    managing a print job that is in progress at a predetermined counting time in a plurality of separate job histories,
    wherein the step of managing includes:
    temporarily suspending the print job that is in progress at the predetermined counting time;
    generating, based on execution information of processing executed before the print job is suspended, a first job history based on first processing of the print job, the first processing being executed before the predetermined counting time;
    resuming the suspended print job; and
    generating, after completion of the resumed print job and based on the first job history and the job history stored in the job-history storage unit, a second job history based on second processing of the print job, the second processing being executed after the predetermined counting time.

2. A printing apparatus comprising:
    a job-history storage unit configured to store, each time a print job is completed, a job history of the print job;
    a counter recording unit;
    a count-up unit configured to count up, each time printing is performed by the printing apparatus, counter information recorded in the counter recording unit; and
    a managing unit configured to manage a print job that is in progress at a predetermined counting time in a plurality of separate job histories,
    wherein the managing unit includes:
        a suspending unit configured to temporarily suspend the print job that is in progress at the predetermined counting time;
        a first generating unit configured to generate, based on execution information of processing executed before the print job is suspended, a first job history based on first processing of the print job, the first processing being executed before the predetermined counting time;
        a resuming unit configured to resume the suspended print job; and
        a second generating unit configured to generate, after completion of the print job resumed by the resuming unit, a second job history based on second processing of the print job, the second processing being executed after the predetermined counting time.

3. The printing apparatus according to claim 2, wherein the second generating unit determines, as the number printed sheets in the second job history, a value obtained by subtracting the number of printed sheets in the first job history from the number of printed sheets in the job history stored in the job-history storage unit.

4. A printing apparatus comprising:
    a job-history storage unit configured to store, each time a print job is completed, a job history of the print job;
    a counter recording unit;
    a count-up unit configured to count up, each time printing is performed by the printing apparatus, counter information recorded in the counter recording unit; and
    a managing unit configured to manage a print job that is in progress at a predetermined counting time in a plurality of separate job histories,
    wherein the managing unit proportionally divides the job history of the print job that is in progress at the predetermined counting time, the job history being stored in the job-history storage unit, according to a ratio between a time period from a start time of the print job to the predetermined counting time and a time period from the predetermined counting time to an end time of the print job.

5. The printing apparatus according to claim 4, wherein the managing unit divides the job history such that the number of printed sheets in the print job that is in progress at the predetermined counting time is proportionally divided according to the ratio.

6. A non-transitory computer-readable storage medium having stored thereon a program comprising program code having computer-executable instructions for causing a computer to execute the print managing method according to claim 1.

7. The print managing method according to claim 1, wherein in the step of generating the second job history, a value obtained by subtracting the number of printed sheets in the first job history from the number of printed sheets in the job history stored in the job-history storage unit is determined as the number printed sheets in the second job history.

8. A print managing method comprising:
    storing, each time a print job is completed, a job history of the print job in a job-history storage unit;
    counting up, each time printing is performed, counter information recorded in a counter recording unit; and
    managing a print job that is in progress at a predetermined counting time in a plurality of separate job histories,
    wherein in the step of managing, the job history of the print job that is in progress at the predetermined counting time, the job history being stored in the job-history storage unit, is proportionally divided according to a ratio between a time period from a start time of the print job to the predetermined counting time and a time period from the predetermined counting time to an end time of the print job.

9. The print managing method according to claim 8, wherein in the step of managing, the job history is divided such that the number of printed sheets in the print job that is in progress at the predetermined counting time is proportionally divided according to the ratio.

* * * * *